United States Patent [19]

Miller et al.

[11] 4,145,080
[45] Mar. 20, 1979

[54] MEAT RAIL SUPPORT SYSTEM

[75] Inventors: Frank J. Miller, Warren; Hem R. Vij, Fraser, both of Mich.

[73] Assignee: Fruehauf Corporation, Detroit, Mich.

[21] Appl. No.: 818,210

[22] Filed: Jul. 22, 1977

[51] Int. Cl.² .......................................... B62D 27/02
[52] U.S. Cl. ................................... 296/183; 105/409
[58] Field of Search ............... 296/28 M, 31 P, 28 R; 105/409, 411, 396

[56] References Cited

U.S. PATENT DOCUMENTS

| | | | |
|---|---|---|---|
| 2,742,866 | 4/1956 | Nystrom | 296/28 M |
| 2,833,588 | 5/1958 | Black | 296/28 M |
| 3,061,364 | 10/1962 | Tanthinger et al. | 296/28 M |
| 3,191,985 | 6/1965 | Chieger | 296/28 M |

*Primary Examiner*—Joseph F. Peters, Jr.
*Assistant Examiner*—Gene A. Church
*Attorney, Agent, or Firm*—Harness, Dickey & Pierce

[57] ABSTRACT

The disclosure relates to a meat rail support system for refrigerator trailers having post-free, foam-filled walls. An outer top rail of the trailer side wall is secured to the outer skin of the side wall. An inwardly extending flange is positioned above the side wall and is either integral with the top rail or riveted thereto for the acceptance of a meat rail support beam.

In one embodiment, an inner side wall top rail of low heat conducting material, for example, FRP plastic, is secured to a plastic inner skin of the side wall and has an outwardly extending flange positioned above the wall. A meat rail support beam extends transversely across the trailer and rests on the flanges of the inner and outer top rails. Fastening means are located between the inner and outer skins of the side wall so as to transfer loads on the meat rail support beam relatively equally to both the inner and outer side wall skins.

In another embodiment, the meat rail support beams are secured to an inwardly extending flange on a roof rail. The inner plastic skin of the side wall is secured directly to the top rail thereof. Heat transfer from the inner walls of the trailers to the exterior thereof in both embodiments is minimized by suitable thermal breaks.

5 Claims, 4 Drawing Figures

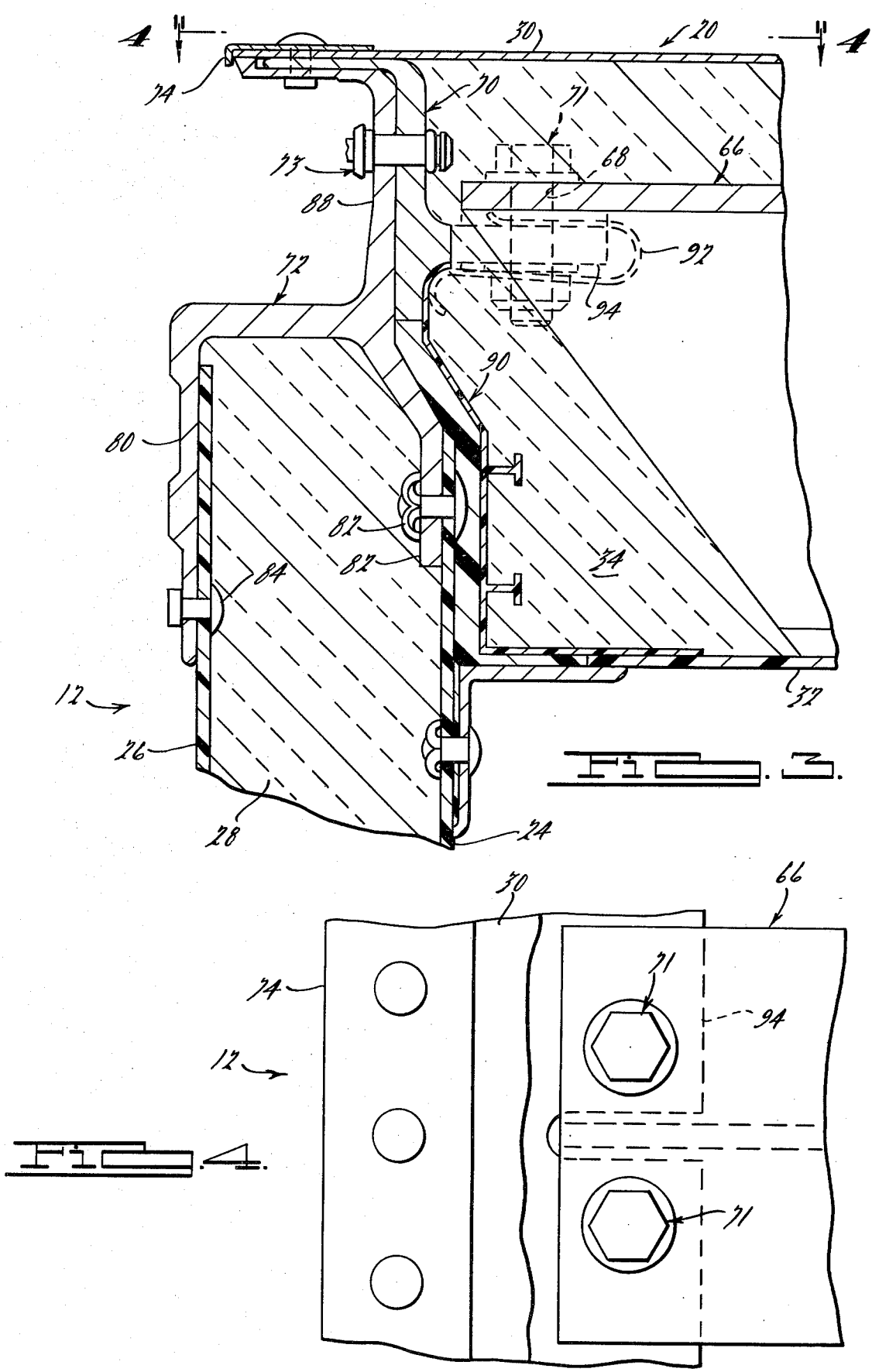

MEAT RAIL SUPPORT SYSTEM

BACKGROUND AND SUMMARY OF THE INVENTION

Over-the-road trailers which are adapted to carry produce, meat and other items hanging from the roof thereof require different structural and thermodynamic considerations than trailers in which the weight is positioned directly on the trailer floor. The load transfer relationship between the roof and side walls must be carefully worked out in order to properly distribute the weight of the hanging items. Such structural problems are particularly acute when the trailer is a refrigerator trailer adapted to carry, for example, carcasses of meat. Often, the walls and ceilings are insulated with materials which, standing alone, are incapable of supporting substantial weight. Such refrigerator trailers often have walls comprised of relatively thin outer skins which are secured to posts so as to support the weight of items hanging from the roof. Accordingly, the broad object of the present invention is to provide an improved, post-free meat rail support system for a refrigerator trailer wherein both the inner and outer skins of the wall are load supporting. Further objects, features and advantages of the present invention will become apparent from the following description viewed in accordance with the accompanying drawings.

BRIEF DESCRIPTION OF THE DRAWINGS

FIG. 3 is a view, similar to FIG. 2, of another embodiment of the invention; and FIG. 4 is a view taken in the direction of the arrows 4—4 of FIG. 3.

DESCRIPTION OF THE PREFERRED EMBODIMENTS

Figures 1, 2:
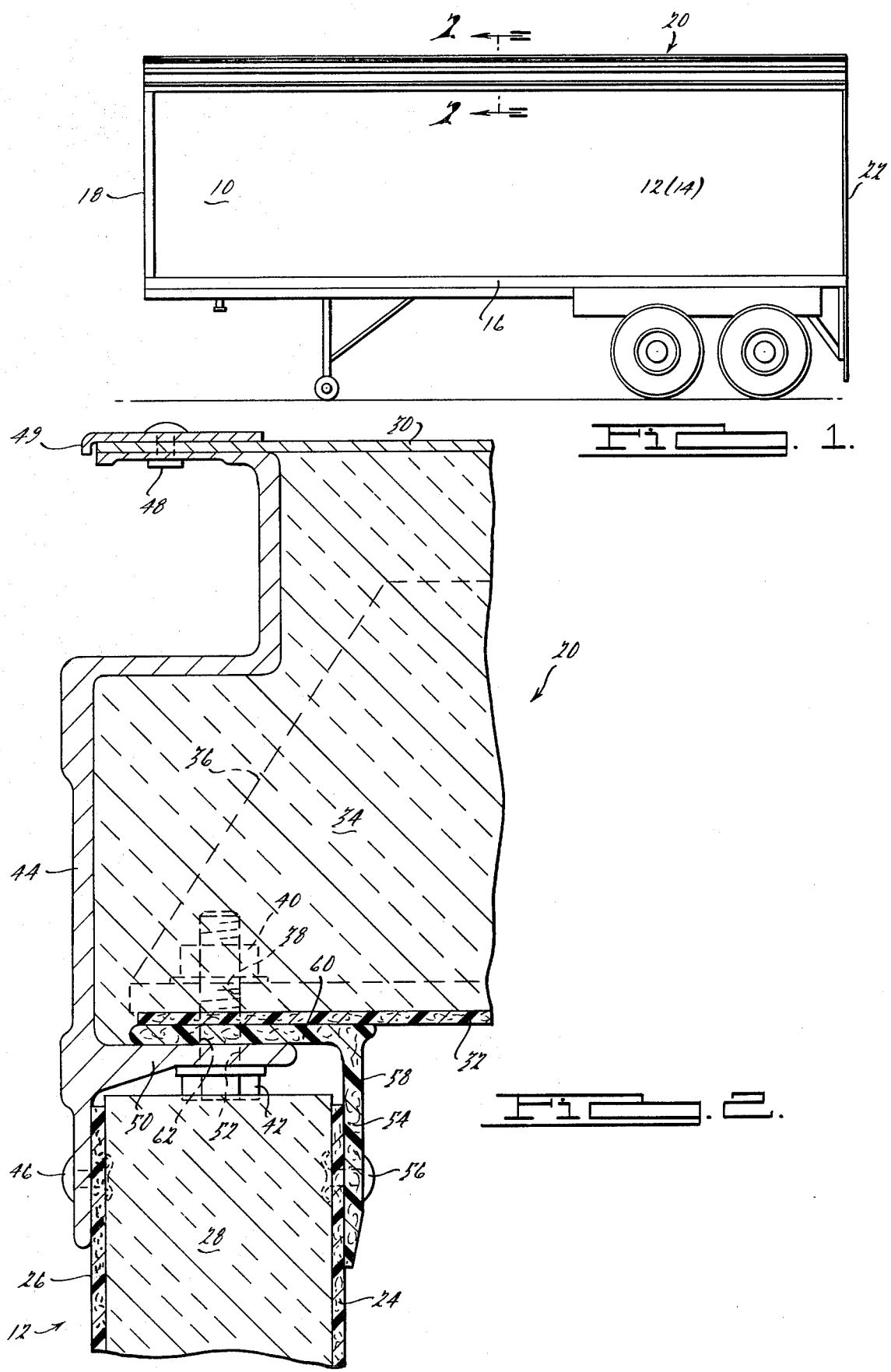
FIG. 1 illustrates a refrigerator trailer utilizing the present invention.
FIG. 2 is a cross-sectional view of a meat rail support system in accordance with the present invention viewed in the direction of the arrows 2—2 of FIG. 1.

FIG. 1 illustrates an over-the-road refrigerator trailer 10 having a pair of side walls 12 and 14, a floor member 16, a front wall member 18, a roof member 20, and a rear wall member 22. In one or more of the side wall members 12 or 14, or the rear wall member 22, one or more doors are provided (not shown). Also, a refrigeration unit (not shown) is generally mounted on the trailer to maintain the interior thereof at a desired temperature.

As shown in FIG. 2, the side wall 12 and opposite side wall 14, comprise plastic skin-foam laminate structures. The side wall 12 comprises a plastic inner skin 24 and a plastic outer skin 26 having a layer of insulating structural foam 28 sandwiched therebetween. The foam 28 is poured or injected between the skins 24 and 26 and bonds securely to the panels forming a relatively lightweight insulating wall. Similarly, the roof member 20 comprises a metallic outer skin 30 and a plastic inner skin 32 with a layer of insulating structural foam 34 sandwiched therebetween.

For use as a refrigerator trailer adapted to haul meat, a plurality of meat rail support beams 36 are integrally "potted" in the foam structure of the roof member 20. The meat rails 36 typically comprise metal I-beams which are secured in place between the roof panel skins 30 and 32 before the foam is injected therebetween. The meat rail support beams 36 have apertures 38 at the opposite ends thereof for connection to the side walls 12 and 14 by means of, for example, a bolt 42 and nut 40.

An outer top rail 44 on the roof member 20 is secured both to the side wall 12 and to the skin 30 of the roof member 20 as by blind rivets 46 and 48, respectively. In this regard, a cap strip 49 is provided to strengthen the connection between rail 44 and roof skin 30.

In accordance with the present invention, the outer rail 44 has an inwardly directed flange portion 50 which extends the entire length of the trailer 10 for the attachment of the meat rail support beams 36. Openings 52 are provided in the flange portion 50 of the top rail 44 for acceptance of the bolt 42.

An inner top rail 54 of non-heat conductive material, for example, FRP plastic, is secured to the inner skin 24 of the side wall 12 as by blind rivets 56. The inner top rail 54 comprises a substantially vertical flange portion 58 which is secured to the inner skin 24, as well as a substantially horizontal flange portion 60. The flange portion 60 extends horizontally outwardly over the top of the side wall 12 in overlying relationship to the inwardly extending flange 50 of the outer top rail 44. A plurality of openings 62 are provided in the flange 60 of the inner top rail 54 for the acceptance of the bolts 42.

It is to be noted that the openings in the two top rails 44 and 54 and the meat rail support beams 36 are located approximately midway between the inner skin 24 and the outer skin 26. In this manner, loading of the inner skin 24 and outer skin 26 of the side walls 12 and 14 is relatively even minimizing buckling thereof upon loading.

In accordance with another embodiment of the present invention, the side wall 12, opposite side wall 14, and the roof member 20 comprise skin-foam laminate structures as discussed hereinbefore, namely, a plastic inner skin 24 and a plastic outer skin 26 having a layer of insulating structural foam 28 sandwiched therebetween. The foam 28 is poured or injected between the skins 24 and 26 and bonds securely to the panels forming a relatively light weight, insulating wall. Similarly, the roof member 20 comprises a metallic outer skin 30 and a plastic inner skin 32 with a layer of insulating structural foam 34 sandwiched therebetween.

The roof panel 20 comprises a plurality of meat rail support beams 66 which are "potted" in the foam structure of the roof panel 20. The meat rail support beams 66 comprise metal I-beams or the like which are secured in place between the roof panel skins 30 and 32 before the foam is injected therebetween. The meat rail support beams 66 have apertures 68 at opposite ends thereof for connection to a longitudinal inner rail 70 by means of, for example, bolts 71.

The inner rail 70 is secured to an outer top rail 72 as by rivets 73. A cap strip 74 is provided to strengthen the connection between rail 70, rail 72 and roof skin 30.

In accordance with the present invention, the outer rail 72 has a pair of downwardly directed flanges 80 and 82 which extend the entire length of the trailer 10 for the attachment of the external skin 26 and internal skin 24, respectively, as by rivets 84 and 86. An upstanding flange 88 supports the inner rail 70 between the flanges 80 and 82 and therefore between the planes of the skins 24 and 26 so as to transfer loads thereto relatively evenly.

An inner foam stop 90 of for example, PVC plastic, is secured between the inner rail 70 and inner roof skin 32 as by clips 92 which engage a horizontal flange 94 on the inner rail 70.

From the foregoing it should be apparent that the side wall 12 and roof 20 can be manufactured as sub assemblies and joined by the rivets 76 after assembly. Loads on the meat rail support beams 66 will be transferred substantially equally to both the inner skin 24 and outer skin 26. In this manner, uneven loading of the side walls 12 and 14 and consequent buckling thereof is eliminated.

In accordance with another feature of the instant invention, the side wall roof system does not contain a metallic heat transfer path between the interior and the exterior of the trailer.

While specific embodiments of the present invention have been illustrated and described in the foregoing specification and accompanying drawings, it is understood that the invention is not limited to the exact construction shown, but that various alterations in the construction and arrangement of parts is possible without departing from the spirit and scope of the invention as more particularly defined by the following claims.

What is claimed is:

1. An improved construction for an over-the-road refrigerator trailer comprising post-free side walls and a roof panel having outer and inner skins with insulating structural foam therebetween,
   an outer top rail secured to the outer skin of said side wall and having an inwardly extending flange above the upper extremity of said side wall,
   an inner face of the innermost top rail secured to the inner skin of said side wall and having an outwardly extending flange at the upper extremity of said side wall,
   a meat rail support beam in said roof panel extending laterally of said side walls and thereacross at the upper extremity of said side walls, and
   a fastening means extending through said meat rail support beam and the flanges on the outer and inner top rails intermediate said outer and inner skins whereby loads on said meat rail support beams are transferred substantially equally and directly to the skins of said side wall.

2. The invention as defined in claim 1 wherein said inner top rail is plastic so as to preclude a metallic heat transfer path from the interior to the exterior of said trailer.

3. An improved construction for an over-the-road refrigerator trailer comprising post-free side walls and a roof panel having inner and outer skins with insulating structural foam therebetween,
   an outer top rail having downwardly extending flanges secured to the outer and innermost skin of said side wall and having an upwardly extending flange above the upper extremity of said side wall and between said downwardly extending flanges,
   an inner top rail on said roof panel secured to the upwardly extending flange of said outer top rail and having an inwardly extending flange,
   a meat rail support beam in said roof panel extending laterally of said side walls, and
   a fastening means for securing said meat rail support beam to the flange on the inner top rail, whereby loads on said meat rail support beam are transferred substantially equally and directly to the skins of said side wall.

4. The invention as defined in claim 3 wherein a foam dam extends between said inner top rail and the inner skin of said roof panel.

5. The invention as defined in claim 4 wherein the upper edge of said foam dam is retained against said inner top rail by a spring clip.

* * * * *

UNITED STATES PATENT AND TRADEMARK OFFICE
CERTIFICATE OF CORRECTION

PATENT NO. : 4,145,080
DATED : March 20, 1979
INVENTOR(S) : Miller et al

It is certified that error appears in the above-identified patent and that said Letters Patent are hereby corrected as shown below:

Claim 1, line 30, after "inner", first occurence, delete --face of the innermost--.

Claim 1, line 31, after "inner", second occurence, insert --face of the innermost--.

Signed and Sealed this

Nineteenth Day of June 1979

[SEAL]

Attest:

RUTH C. MASON
*Attesting Officer*

DONALD W. BANNER
*Commissioner of Patents and Trademarks*